Nov. 24, 1931.　　　A. E. STRINGER　　　1,833,187
EXPANSION PIPE FITTING
Filed Jan. 2, 1929
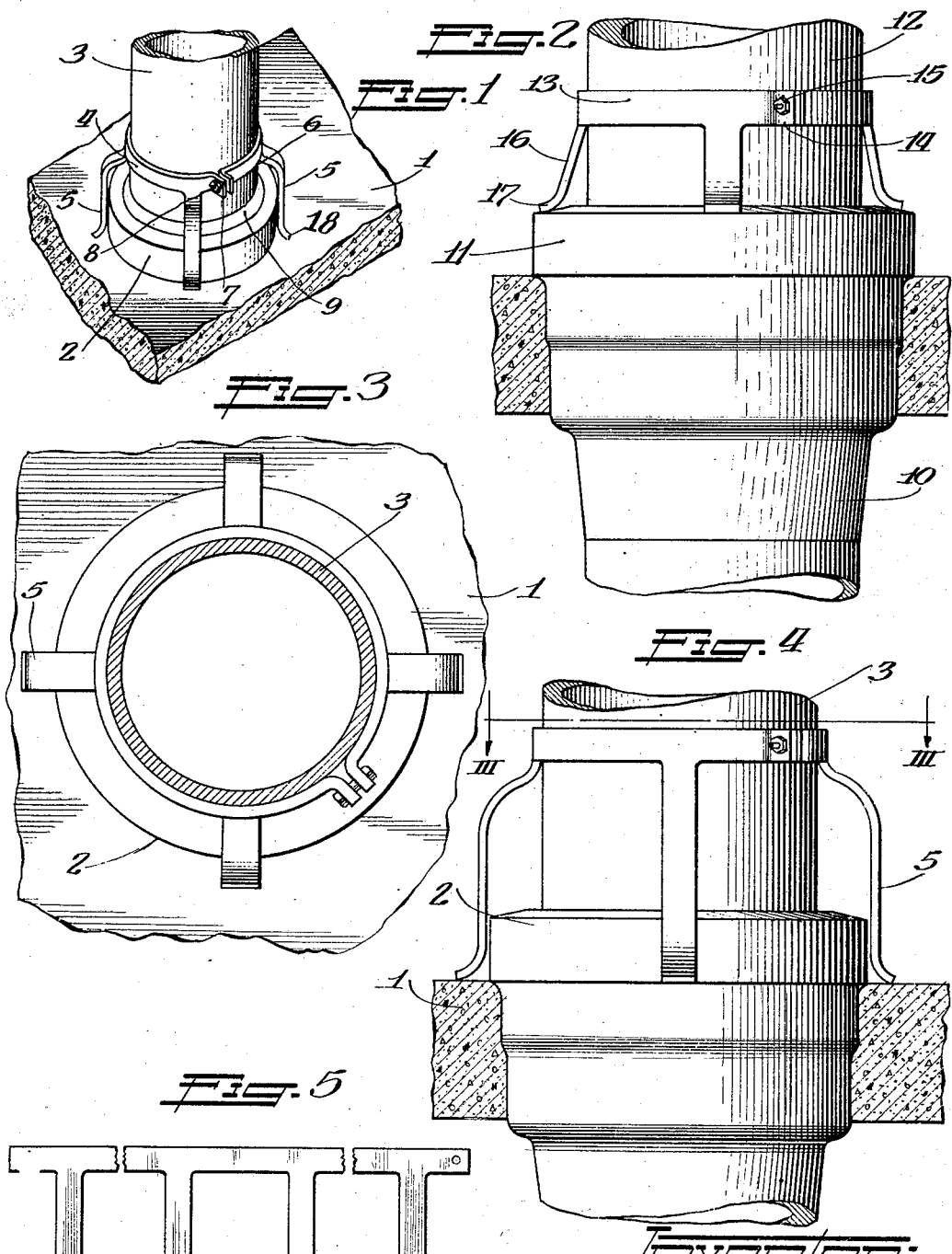
Inventor:
Alfred E. Stringer.

Patented Nov. 24, 1931

1,833,187

UNITED STATES PATENT OFFICE

ALFRED E. STRINGER, OF CHICAGO, ILLINOIS

EXPANSION PIPE FITTING

Application filed January 2, 1929. Serial No. 329,927.

This invention relates to an expansion pipe joint fitting and especially to joints of soil and vent pipes for plumbing stands or stacks in buildings.

Building construction at the present time frequently requires that the plumbing pipe stacks be installed ahead of the installation of the permanent flooring necessitating in a temporarily supporting of the pipe stacks until such time as the permanent flooring is put in place. It is necessary in such installations, therefore, to provide expansion joints at various places in pipe stacks so that when the stacks are put in use, the range of temperatures of the waste water and the like will cause expansion and contraction of the pipe, and will prevent buckling of the pipe and cracking of the caulking material.

An object of this invention is to provide a fitting for providing expansion joints in pipe stacks to temporarily support the stacks with the various pipe connections and fittings spaced in such manner to allow for expansion and contraction when in use.

Another object of the invention is to provide a fitting for temporarily spacing adjacent pipes in pipe stacks during construction of the building which fitting may be removed after the pipe stack has been secured permanently in position.

A further object of the invention is to provide a fitting for external application to certain of the pipe members in a pipe stack for providing expansion joints at desired places in the stack.

The above, other and further objects of the invention will be apparent from the following description, accompanying drawings and appended claims.

An embodiment of the invention is illustrated in the accompanying drawings and the views thereof are as follows:

Figure 1 is a fragmental perspective view of a pipe supported by the fitting of this invention, the fitting in this figure being shown as resting on the permanent floor.

Figure 2 is a fragmental elevational view partly in section of a fitting similar to that shown in Figure 1, but in this instance is supported on the upper end of the bell mouth of a pipe section.

Figure 3 is a section taken on line III—III of Fig. 4,

Figure 4 is a view similar to Figure 2, showing the fitting supported on the permanent floor.

Figure 5 is a fragmental developed view of the expansion fitting.

The exemplification of the invention as set forth in the accompanying drawings is shown as applied to a single expansion joint, but it is to be understood that it may be applied to every joint in a pipe stack where it is necessary to apply an expansion joint in the same.

Figure 1 illustrates a fragmental portion of a permanent floor 1, in which is embedded the bell mouth 2 of a pipe section or flange fitting. The pipe 3 has its lower end within the bell mouth 2, and is supported in spaced relation in said bell by means of a fitting comprising a ring 4 having a plurality of legs 5, which are out-turned to avoid the bell mouth 2. The ends of the ring are turned outwardly at 6 and 7 to receive a bolt 8 for clamping together the ends of the ring about the pipe 3 and support the same in spaced relation in the bell mouth 2 during the time that the caulking seal is applied. The fitting also serves to support the pipe 3 in spaced relation within the bell mouth 2 until the pipe 3 is permanently secured in position in the building structure and until such time as it is desirable to remove the fitting. The fitting, however, need not be removed, but may be allowed to remain clamped to the pipe 3, and when expansion takes place the legs 5, which it will be observed, have out-turned ends 18, will slide away from the bell mouth 2 as the ring 4 is moved toward the floor 1, or these ends 18 might be notched so as to break off and thus allow relative axial movement between the pipe 3 and the bell mouth 2.

A caulking seal 9, comprising oakum and lead, is applied within the bell mouth 2 and about the end of the pipe 3 within said bell mouth for sealing the joints between these pipes which type of seal has been found to be such as to allow axial movement of the pipe sections without breakage.

The form of the invention illustrated in Figure 2, discloses a bell mouth pipe end having a bell mouth 11, with a pipe 12 supported in the bell 11, in spaced relation so as to allow for expansion in use.

The spacing fitting disclosed in Figure 2 comprises a ring 13 surrounding the pipe 12, having its free ends 14 clamped by a bolt and nut 15. The ring 13 is provided with a plurality of outwardly directed legs 16, the ends of which terminate in out-turned feet 17. The ring is so arranged that the out-turned ends 17 of the legs rest on the top margin of the bell mouth 11. Expansion causes relative axial movement between the pipes 10 and 12, in which event the ring 13 moves with the pipe 12. Should this movement result in moving the pipe 12 toward the bell mouth 11, then the legs 16 will spread outwardly from the position of the same as shown in Figure 2.

It is within the contemplation of this invention to remove the rings 4 or 13 after the pipe stand or stack has been installed and permanently secured in position in the flooring of the building.

It will be observed that the expansion joint fitting of this invention is one which is readily applied to the several pipes which have to be temporarily supported in spaced relation within the bell mouth of the various members and which supporting fittings may be removed after the stack has been permanently secured in position.

The legs of either type of fitting may be of yielding material so as to readily yield away from supporting position as the pipes move towards each other under influence of temperature changes of the waste material passing through the pipes. The legs might also be notched at the ends so that the ends would break off when such movement takes place, for allowing said movement without causing lateral displacement of the pipe or cracking of the caulking seal 9.

Should the form of fitting shown in Figures 1, 3 and 4 be used in temporarily supporting the pipes in spaced relation and before the permanent floor 1 is installed, then a suitable frame member of falsework may be arranged to support the legs 5 of such fitting during such time that the permanent floor 1 is incomplete.

The invention has been described herein more or less precisely, yet it is to be understood that changes may be made in the arrangement and proportion of parts and that equivalents may be substituted without departing from the spirit and scope of the invention.

The invention is claimed as follows:

1. An expansion pipe joint fitting for pipe stacks comprising a ring clamped to a supported pipe, said ring having legs for unrestrainedly engaging a support to temporarily hold said pipe in spaced relation in a mating member, said legs being slideable on said support and away from said pipe as the same moves towards said support under expansion.

2. An expansion pipe joint fitting for pipe stacks comprising a ring removably clamped to the exterior of a pipe, said ring having legs for unrestrainedly engaging a support to temporarily hold said pipe in spaced relation to a mating member, said legs being slidable on said support and away from said support as said pipe moves toward said support under expansion.

3. An expansion pipe joint fitting for pipe stacks comprising a ring arranged to be clamped to a pipe for supporting the same in spaced relation with respect to a mating member, said ring having yielding legs for slidably engaging a support to hold said pipe in spaced relation, and said ring being removable after said supported pipe has been permanently fixed in position.

In testimony whereof I have hereunto subscribed my name at Chicago, Cook County, Illinois.

ALFRED E. STRINGER.